United States Patent [19]
Noble et al.

[11] Patent Number: 4,736,258
[45] Date of Patent: Apr. 5, 1988

[54] HIGH DENSITY STORAGE OF INFORMATION ON A COMPACT DISC

[75] Inventors: Lowell A. Noble, 18138 Bancroft Ave., Monte Sereno, Calif. 95030; Edmund Sandberg, Santa Clara; Norman L. Noble, Los Gatos, both of Calif.

[73] Assignee: Lowell A. Noble, Monte Sereno, Calif.

[21] Appl. No.: 890,705

[22] Filed: Jul. 25, 1986

[51] Int. Cl.$^4$ .................. H04N 5/85; G11B 7/013
[52] U.S. Cl. ...................... 358/342; 369/59; 369/109; 369/124; 369/275
[58] Field of Search .............. 369/59, 109, 111, 275; 358/342, 335

[56] References Cited

U.S. PATENT DOCUMENTS

| | | | |
|---|---|---|---|
| 4,161,752 | 7/1979 | Basilico | 369/275 |
| 4,175,270 | 11/1979 | Zenzefilis | 358/342 |
| 4,428,075 | 1/1984 | Hazel et al. | 369/275 |
| 4,525,822 | 6/1985 | Nishimura | 369/59 |

OTHER PUBLICATIONS

Tseng, IBM Tech. Disclosure Bul., vol. 24, No. 3, Aug. 1981, pp. 1579–1582, "Encoding Schemes for Video Disk".

Primary Examiner—Donald McElheny, Jr.
Attorney, Agent, or Firm—Thomas M. Freiburger

[57] ABSTRACT

An optical storage system achieves high density, sufficiently high to permit both video and audio to be stored on a compact disc, or to store other data at very high density. Pits are encoded on the disc storage medium with respect to timed electronic reference signals (not simultaneously optically encoded on the disc) which divide each revolution of the disc into a multiplicity of equal spaces or references. The pits have leading edges on the leading side of a reference signal and trailing edges on a trailing side of the reference signal, so that each pit staddles a reference signal. The length of the pit leading up to the reference signal represents one sample of information, while the length of the pit from the reference signal to the pit's trailing edge represents another sample of information. In this manner high density is achieved at high accuracy and low noise, since one end of each bit of information is precisely located and readable without the lesser precision involved in determining the location of the leading and trailing edges of the pit in reading the information. On the disc the reference signal frequency is generated during the vertical retrace interval(s), encoded by equally spaced pits, for correlation with the prevailing speed of revolution of the disc. At each horizontal picture line (e.g., 525 per revolution) there is at least one reference pit. When this is detected the amount of phase shift which may exist at that line is measured and corrected for. Two samples of the video waveform are reproduced and measured for each pit. Small compact video discs can be produced with inner diameters of 2" to 4", or video bandwidths of up to 10 MHz can be produced for high resolution pictures.

17 Claims, 2 Drawing Sheets

DEMODULATION SYSTEM

MODULATION SYSTEM — WRITE

DEMODULATION SYSTEM — READ

DEMODULATION SYSTEM

HIGH DENSITY STORAGE OF INFORMATION ON A COMPACT DISC

BACKGROUND OF THE INVENTION

The invention relates to optical data and information storage systems, especially systems using lasers for encoding and reading.

In particular, the invention relates to a system for encoding and reading samples of analog information on an optical disc, in a manner that achieves high density and high precision. One important feature of the invention is the ability to achieve optical information storage at sufficient density that a video picture can be stored and generated in one revolution of a compact optical disc, with a 2" inner diameter for recording. A second feature is the ability to sample at a bandwidth greater than 10 MHz to obtain a high resolution video picture.

Optical data storage systems involve encoding of information by burning pits or exposing photoresist into the surface of a data storage medium, which may be a rotatable disc. The pits can either burn through the medium or create holes in a developed photoresist, creating a light transmissive opening which is read from the other side of the medium, or simply make a reflective medium surface nonreflective at the location of the pit, in systems which read reflected light. The pits, usually generated by a laser beam, can carry information either by digital storage encoding or analog encoding. In digital encoding, at each reading location there is either a pit or no pit. In analog systems, information can be represented by the length of a pit, or the distance between pits, or both.

In many typical systems prior to the present invention, analog information was contained in the length of each pit, and also repeated by the length between pits, FM modulation. The object was to reduce noise, by making a double encoding and a double reading of each sample, then averaging the two in the reading mode in order to reproduce the information more precisely. Although such systems have been effective in reducing noise, they have been inefficient in the sense that additional space is required for the double recording of each bit of information on the disc. In video discs, for example, this has led to the need for a 12" disc, with accurate encoding only possible beginning at about 4" of diameter and extending outwardly. By convention, one revolution of the disc is used to generate a video picture, or frame, in the CAV mode (constant angular velocity), and with the prior encoding systems there was not sufficient storage space available in a revolution inside the 4" diameter line.

U.S. Pat. No. 4,175,270 issued to George Zenzefilis, discloses an information storage system which utilizes a series of magnetic reference signals encoded on the magnetic medium and dividing up the storage medium, and which involves encoding of information in such a way as to straddle a magnetic reference signal located on the inner portion of the disc. (See, e.g., FIG. 5A). However, this is in the context of magnetic storage, not optical storage. The magnetic storage domain for each bit of information takes up considerably more medium space than does optical storage, presenting different considerations. The patent discloses a photographically-encoded embodiment, but not one using laser encoding and reading, especially of reflective surfaces.

Moreover, Zenzefilis encodes his "clock track" of reference signals at an inner location on a video disc, near the center, and his system requires two pickup heads, one in fixed radial position for detecting the clock track signals, and one positioned outwardly and radially movable for picking up the video information. Still further, in Zenzefilis' system each segment or sample of information is associated with an element of the video display, i.e., a pixel containing chroma and luminance information, and all segments are arrayed in radial lines along the clock signals so that discrete segments from circumferential path to path corresponding to a particular element or pixel are located at generally the same angular position from the center of rotation.

Prior information storage and retrieval systems, both magnetic and optical, have not been capable of the combined density, precision and adaptability enabled by the present invention described below.

SUMMARY OF THE INVENTION

In accordance with this invention, high density, low noise optical data storage is achieved by using a series of precisely timed electronic reference signals, dividing each revolution of an optical storage disc into a large number of spaces or references. Each pit written on the optical storage medium is synchronized to one of the electronic reference signals. The electronic reference signals are generated by a phase lock loop oscillator that is synchronized with reading of the disc, and this synchronization occurs during a time or portion of the disc wherein no information is being read. For the video signals this time represents the vertical and horizontal retrace times. The electronic reference signal forms an end of each sample of analog information stored on the medium. In a preferred embodiment, this is accomplished by writing each pit across an electronic reference signal, such that the pit contains two samples of information: the length of the pit from its leading edge to the location of the reference signal represents one sample, while the length of the pit from the reference signal to the pit's trailing edge represents a different sample.

In this way, one end of each sample of information is very precisely located by the precisely timed electronic reference signal. Only the other end of each sample must be determined by reading the threshold of a pit, which is subject to limitations in accuracy.

Accordingly, higher density information storage is achieved by placing two samples of information at each electronic reference signal, and high precision/low noise is accomplished by use of the electronic reference signal as a boundary of each sample stored.

A further feature of the invention is that a reference frequency is stored in pits on the disc, so that regardless of motor speed variation the samples around the circumferential paths will be correlated to prevailing motor speed. These reference pits are located in the vertical retrace interval on each path, or in both vertical retrace intervals with the conventional two fields per frame.

Along the path of pits in a revolution, the samples will inevitably go out of phase somewhat, due to variations in the speed of the driving motor. In video applications this is corrected for at each horizontal line in the picture, e.g., 525 times per revolution, utilizing one or more pits which may be at the beginning of each line, preferably in the horizontal retrace interval. Their position is sensed with respect to the electronic reference signal as set at the last vertical retrace, and correction is made electronically. In other data storage applications such phase shift detection and compensation can be performed at appropriate intervals depending on required accuracy.

In the system of this invention, preferably each pit does not contain both chroma and luminance information, i.e., a pixel or picture element. Rather, both ends of a given pit contain either chroma and luminance, as part of a curve that carries chroma and luminance. This is in contrast to the prior art Zenzefilis system.

It is a further advantage and feature of the invention to separate the synchronous signal in the video wave form from the information necessary for the chroma and luminance.

It is therefore among the objects of the invention to achieve high density and low noise in optical data storage, and in particular to the extent that both video and audio can be stored on a compact optical disc of about 4¾" outer diameter, wherein the video picture is reconstructed each revolution.

These and other objects, advantages, features and characteristics of the invention will be apparent from the following description of preferred embodiments, considered along with the accompanying drawings.

A further feature of the invention is that the reference frequency of the electronic reference signal is stored in pits on the disc, so that regardless of motor speed variation the samples around the circumferential paths will be correlated to the prevailing motor speed, at least at the start of a revolution. In video application these frequency reference pits are located in the vertical retrace interval on each track, or in both vertical retrace intervals with the conventional two fields per frame. In other data storage applications they can be located in any selected interval.

The electronic reference signal in accordance with preferred embodiments of the invention is generated by a crystal controlled sync generator in the recording mode, and by a phase lock loop in the reading mode. The phase lock loop, in association with the demodulator, picks up the frequency of the frequency reference pits, and adjusts to that frequency and sets oscillation at that frequency, until another series of frequency reference pits are encountered, in the next field.

Along the path of pits in a revolution, the samples will inevitably go out of phase somewhat, due to variation in the speed of the driving motor. In video applications this is corrected for at each horizontal line in the picture, e.g., 525 times per revolution, utilizing one or more pits which may be at the beginning of each line, preferably in the horizontal retrace interval. Their position is sensed with respect to the electronic reference signal as set at the last vertical retrace, and correction is made electronically. In other data storage applications such phase shift detection and compensation can be performed at appropriate intervals depending on required accuracy.

In the system of this invention, preferably each pit does not contain both chroma and luminance information, i.e., a pixel or picture element. Rather, both ends of a given pit contain either chroma and luminance, as part of a curve that carries chroma and luminance. This is in contrast to the prior art Zenzefilis system.

It is a further advantage and feature of the invention to separate the synchronous signal in the video wave form from the information necessary for the chroma and luminance.

In the normal FM encoding system the synchronous signal for each horizontal line is encoded just before the chroma and luminance information. The FM signal must be decoded to obtain the sync signal. If the FM signal is weak it may not be decoded and the sync signal will be lost.

In the preferred embodiment of the invention the sync signal is stripped from the video signal, and encoded as a simple digital signal at the end of the horizontal retrace time. The sync signal is easily read without demodulation being necessary. After the digital sync signal is detected, the chroma and luminance signals are demodulated and added to a regenerated sync signal to obtain a standard NTSC video signal.

It is therefore among the objects of the invention to achieve high density and low noise in optical data storage, and in particular to the extent that both video and audio can be stored on a compact optical disc of about 4¾" outer diameter, wherein the video picture is reconstructed each revolution, starting at a 2" inner diameter.

A further objective is the mixing of video information, digital information, and digital audio information on the same disc. The discs will normally spin at 1800 RPM in CAV mode and at 800 RPM to 1800 RPM in constant linear velocity mode.

These and other objects, advantages, features and characteristics of the invention will be apparent from the following description of preferred embodiments, considered along with the accompanying drawings.

DESCRIPTION OF THE DRAWINGS

FIG. 4 also includes a series of graphic representations of the voltages produced at various stages of the electronics for demodulating and reproducing the original video wave forms.

DESCRIPTION OF A PREFERRED EMBODIMENT

Figure 1:
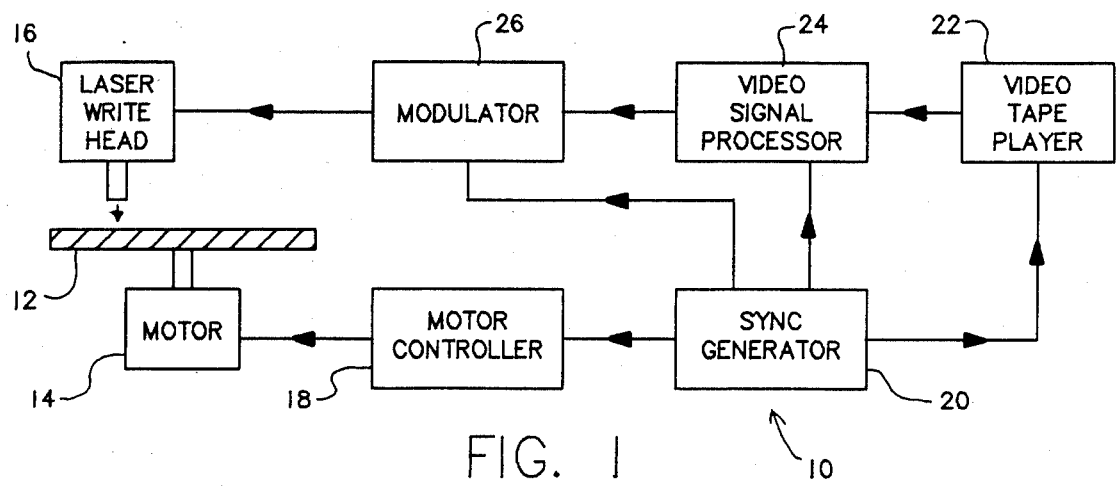
FIG. 1 is a schematic block diagram of a writing or recording system in accordance with the invention, showing an optical information storage disc and equipment associated with recording onto the disc.

In the drawings, FIG. 1 shows a WRITE or RECORD system 10 in accordance with the principles of the invention, in block diagram form. In this system an optical disc 12 is driven by a motor 14 while being encoded by a write head 16, preferably a laser write head. The motor is connected to a motor controller 18 which receives a signal from a crystal controlled sync generator 20.

In this example, a video signal is being encoded on the optical disc 12. A video tape player 22 may be the source of the video signal, and it is connected to a video signal processor 24 and to the sync generator 20, there being synchronizing reference signals on the tape being encoded Reference numbers are associated with each frame to permit random interactive access to each frame. Each frame can be video, digital or audio data. The intial samples of information identify each track and direct the electronic signals to the appropriate decoding electronics.

A modulator 26 modulates the signal from the signal processor 24 to a form which enables the write head 16 to encode the video signal data in the form of pits on the disc 12 in accordance with the invention.

As indicated in FIG. 1, the sync generator 20 is also connected to the modulator 26 to control the timing of the modulation and encoding of data onto the disc.

Figure 2:
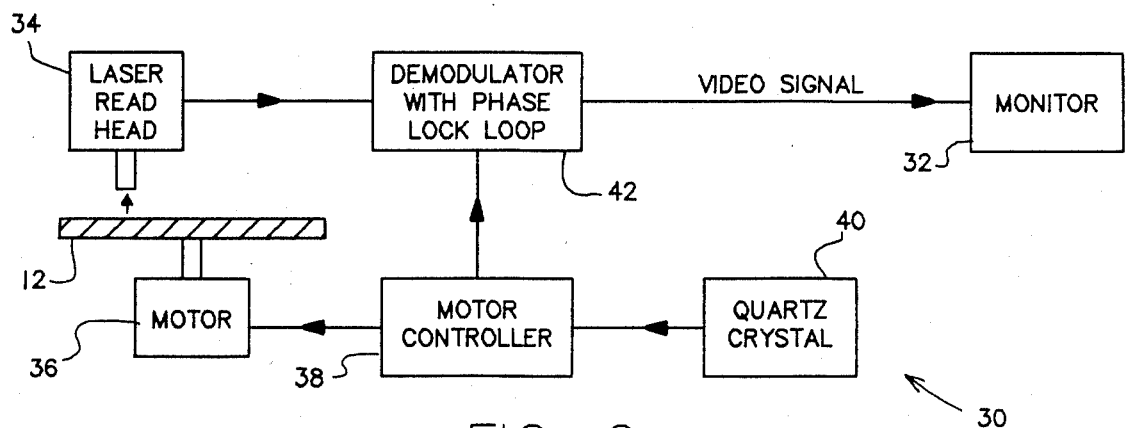
FIG. 2 is a block diagram showing a reading system in accordance with the invention, for demodulating the optically encoded information, correlated with an electronic reference signal.

FIG. 2 shows a READ subsystem 30 of the invention, for decoding the information encoded on the disc 12 and for feeding the information to a video monitor 32. As illustrated in FIG. 2, a laser read head 34 picks up information from pits encoded on the disc 12, the disc being driven by a motor 36. As in prior art systems, the motor speed is controlled by a phase lock loop including a motor controller 38 fed a signal by a crystal oscillator 40, with feedback to the controller 38 from the read head 34. The read head picks up sync signals from the disc 12 and these are fed back to the motor controller 38 to as nearly as possible keep the disc 12 rotating at the prescribed speed.

Of course it is not possible to keep the motor rotating at precisely the right speed for accuracy of pickup of the densely stored information in accordance with the invention, and a demodulator 42 of the system accordingly includes a phase lock loop for setting an oscillation in accordance with sensed prevailing motor speed, thereby creating an electronic reference signal which can be precisely timed to the pits encoded in accordance with this invention, as further explained below. The phase locked loop may be altered by changing its characteristics from a low "Q" or resonance momentum for setting the frequency to a higher "Q" or resonance momentum for maintaining a constant frequency during a horizontal line time sequence. The referenced equipment and circuitry is known to those skilled in the art and does not form a specific part of this invention.

Figure 3:
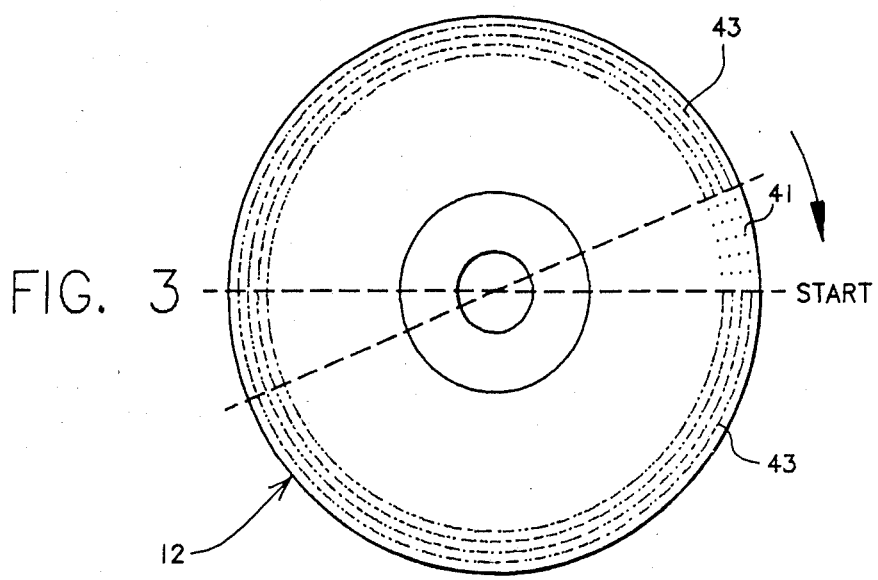
FIG. 3 is a plan view showing an optical storage disc, with a radial line in the drawing representing a synchronization signal encoded optically on the disc as a START reference for each revolution of the disc. The vertical retrace interval contains many uniform reference pits.

FIG. 3 shows the disc 12 and the location of the pits 41 for setting the reference signal frequency. These are located in the area or time of the vertical retrace interval The pits are uniform and at a frequency of 5.35 MHz for high density encoding or at a frequency of 10.7 MHz for high resolution encoding. The information pits 43 contain the double samples of information.

Figure 4:
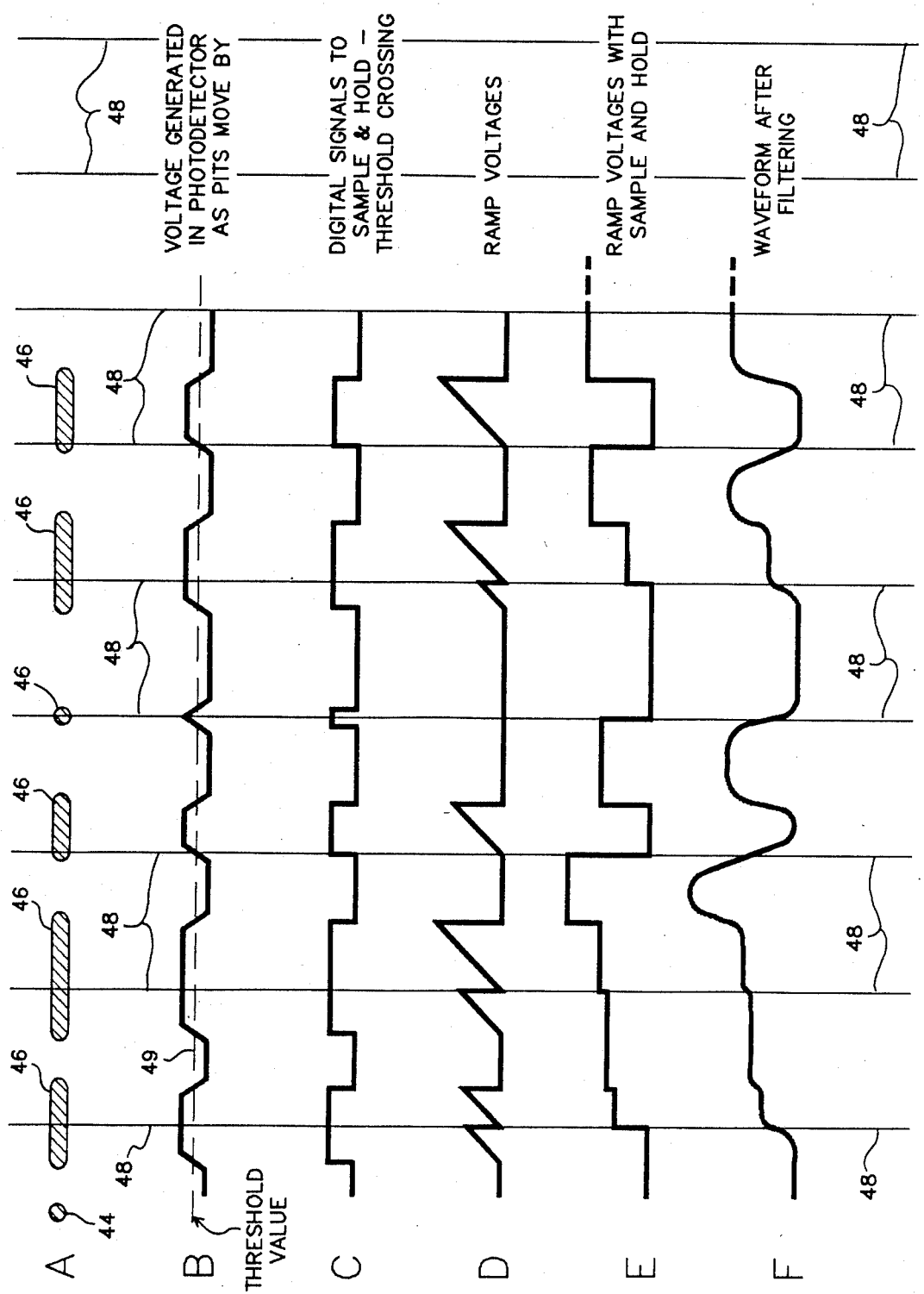
FIG. 4, consisting of A–F, is a close up view of the information pits showing information encoding in accordance with the principles of the invention, wherein each pit is associated with an electronic reference signal. Each pit carries two samples of information.

FIG. 4 shows the demodulation system as associated with individual pits and the electronically generated reference signals.

Line A shows the laser beam (44) spot size and the pits 46. The electronic reference signals are shown as 48.

Line B shows the signal generated from the photo detector as the pits pass by, and the threshold reference voltage 49. A sample and hold circuit is timed from the threshold crossovers and the reference signals.

An electronic ramp voltage is started at the beginning of each pit and at the electronic reference signal 48 The sample and hold is turned on at the time of the reference signal and at the end of each pit.

The resulting wave form is shown in Line E, and after filtering and smoothing the final wave form is generated as shown in Line F.

For a video signal, the final regenerator wave form may contain the synchronous signal, the chroma signal and the luminance, or the synchronous signal may be transferred digitally since it is a single pulse and only the chroma and luminance transferred in analog manner.

A video wave form is shown but other wave forms may be used that require transfer and timing. The system of this invention may be used for other types of data storage, although this preferred embodiment is illustrated and described in connection with video.

The above described preferred embodiment is intended to illustrate the principles of the invention, but not to limit its scope. Other embodiments and variations to this preferred embodiment will be apparent to those skilled in the art and may be made without departing from the scope of the invention as defined in the following claims.

We claim:

1. A method for high density encoding and retrieval of information on a disc, comprising:
   allocating on the disc a large number of spaces for each revolution, using an electronic reference signal generated by equipment associated with writing and reading of the disc, but not physically encoded on the disc; and
   writing or encoding information on the disc by producing information pits on the disc, timed to occur simultaneously with the occurrence of said electronic reference signal generated externally, with a pit located to straddle the timing of an electronic reference signal, and representing one sample of information by the length of the pit leading up to the electronic reference signal and representing a different sample of information by the length of the same pit extending beyond the electronic reference signal;
   whereby two samples of information may be stored at the location of each electronic reference signal and each pit, and whereby the electronic reference signal acts as one end of each sample of information.

2. The method of claim 1, wherein the electronic reference signals are sufficiently high in number around the disc to produce a video picture in accordance with NTSC standards in one revolution of the disc at about 2" diameter of the disc and greater, at speeds of substantially 800 to 3000 RPM.

3. The method of claim 1, further including reserving at least one interval on the disc each revolution for timing, and encoding a series of frequency reference pits in the timing interval to represent the electronic reference signal frequency for reading of the disc until the succeeding timing interval.

4. The method of claim 1, wherein the information is a video signal and wherein the disc includes at least one vertical retrace interval for each revolution, with a series of pits encoded in the retrace interval to represent a frequency as the disc is read, and including detecting the pits and frequency and correlating the reading of the information on the disc in a forthcoming revolution with the frequency representing prevailing disc revolving speed for that revolution.

5. The method of claim 4, further including encoding at least one pit substantially at the location on the disc of each horizontal line for the picture being generated, and including detecting said one pit on reading of the disc and electronically correcting for any phase shift at each horizontal line.

6. The method of claim 5, wherein each revolution of the disc is divided into a plurality of substantially equal spaces by the series of timed electronic reference signals, and wherein the density of the electronic reference signals and spacings is sufficient to produce a video picture in accordance with NTSC standards in one revolution of the disc, at a disc diameter location of about 2" and greater.

7. A high density encoding system, comprising means for generating information pits on a disc representing two samples of information in a single pit at the timing of an electronic reference signal, with the pit straddling the electronic reference signal and containing one sample of information represented by the length of the pit behind the electronic reference signal and another sample of information represented by the length of the pit in front of the electronic reference signal, and including reference signal generating means operatively connected to the pit generating means, for generating the electronic reference signal separately from but in synchronization with the pits.

8. The system of claim 7, wherein the disc is an optical video disc with at least one vertical retrace interval each revolution and further including frequency sync generating means for encoding a series of equally spaced frequency pits in each vertical retrace interval, representing a detectable frequency associated with the prevailing speed of rotation of the disc for each revolution.

9. The system of claim 8, further including frequency detecting reading means for detecting the frequency pits at each vertical retrace interval to detect the prevailing speed of rotation of the disc, and for generally correlating the reading of information following the retrace interval with the prevailing speed.

10. The system of claim 9, further including phase shift adjustment means for encoding at least one phase pit at each of a large plurality of horizontal line locations on the disc between vertical retrace intervals, to represent the phase of the information at that location.

11. The system of claim 10, wherein the phase shift adjustment means includes, in reading equipment associated with the system, correction means for detecting phase shift at each horizontal line by detecting the timing of the phase pit and electronically correcting for phase shift in the generation of video picture information.

12. The system of claim 7, further including sync generating means for encoding synchronizing signals as digital pulses on the disc, at least at one location per revolution of the disc, with the information pits following the digital pulses and containing analog information.

13. The system of claim 12, wherein the digital synchronizing pulse is used to regenerate an analog sync signal which is recombined with a demodulated analog signal to produce an integrated waveform.

14. In an information retrieval and display system, the combination comprising:

disc-type storage means for the information retrieval and display system, the disc-type storage means containing a center and a series of optically readable pits in the surface thereof arranged in a plurality of substantially circular tracks, with the circular tracks being arranged substantially in concentric circles about the disc center, and each of the pits containing two stored items of optically encoded information, one item being located at one end of the pit and the other item located at the opposed end of the pit, and including reference frequency pits on the track for providing timing signals representative of the speed of rotation of the disc and for providing reference signal timing for decoding the samples of information;

player means for reading and reproducing stored information contained on a disc storage means of the type containing spaced embedded pits arranged in tracks representing recorded information, said player means including:

means for rotating the disc-type storage means;

oscillator means for generating synchronizing signals, said oscillator means including a phase locked loop and frequency adjusting means;

means for detecting information contained in said reference frequency pits on the disc-type storage means and responsive thereto for providing an input to the oscillator frequency adjusting means;

means for reading each of the front and rear portions of each pit contained in the disc-storage means tracks and securing information therefrom, and means for processing the secured information; and means for outputting the processed information.

15. A disc-type storage means for an information retrieval and display system, the disc-type storage means containing a center and a series of optically readable pits in the surface thereof arranged in a plurality of substantially circular tracks, the circular tracks being arranged substantially in concentric circles about the disc center, and substantially each of the pits containing two stored samples of optically encoded information, one sample being located at one end of the pit and the other sample located at the opposed end of the pit, the two ends of the pits being divisible by an electronic reference signal generated externally from the disc-type storage means; and substantially each circular track containing a series of synchronizing pits for providing timing signals to represent the speed of rotation of the disc and for generating the electronic reference signal for reading each sample of optically encoded information.

16. The disc-type storage means of claim 15, wherein the synchronizing pits are spaced in accordance with a frequency and are aligned radially from track to track.

17. The disc-type storage means of claim 16, wherein the optically encoded information comprises a video signal having vetrical hold, horizontal hold, colorburst and carrier information, and wherein each is recorded on the optical disc in radial alignment and in phase from track to track.

* * * * *